United States Patent [19]

Olson

[11] 3,753,755

[45] Aug. 21, 1973

[54] SHEET MATERIAL COATED WITH HEAT HARDENABLE TACKY ADHESIVE

[75] Inventor: Melvin M. Olson, Richfield, Minn.

[73] Assignee: Minnesota Mining and Manufacturing Company, St. Paul, Minn.

[22] Filed: Apr. 26, 1971

[21] Appl. No.: 137,660

Related U.S. Application Data

[63] Continuation-in-part of Ser. No. 855,361, Sept. 4, 1969, which is a continuation-in-part of Ser. No. 785,839, Nov. 5, 1968, abandoned.

[52] U.S. Cl......... 117/3.1, 117/122 P, 117/122 PA, 152/235, 206/59 C, 260/836
[51] Int. Cl. ................................................. C09j 7/02
[58] Field of Search .................. 117/122 P, 122 H, 117/122 PF, 122 PA, 68.5, 76 A; 260/836, 837; 206/59 C

[56] References Cited
UNITED STATES PATENTS

| | | | |
|---|---|---|---|
| 3,326,741 | 6/1967 | Olson | 117/68 |
| 3,420,914 | 1/1969 | May | 260/837 |
| 3,432,478 | 3/1969 | May | 260/837 |
| 3,307,690 | 3/1967 | Bond et al. | 117/122 X |
| 3,301,743 | 1/1967 | Fekete et al. | 260/836 X |
| 3,373,075 | 3/1968 | Fekete et al. | 260/837 UX |
| 3,317,465 | 5/1967 | Doyle et al. | 260/86.7 X |

FOREIGN PATENTS OR APPLICATIONS 6,900,869  7/1969  Netherlands................... 260/837

*Primary Examiner*—William D. Marin
*Assistant Examiner*—Bernard D. Pianalto
*Attorney*—Alexander, Sell, Steldt & Delahunt

[57] ABSTRACT

Sheet material coated with heat-hardenable, tacky adhesive to form adhesive tapes, bonding films and simiar products. The tacky adhesive layer provides for temporarily adhering one structure to another at ordinary temperatures and can be subsequently heat-hardened to a strong, permanent bond. Another aspect of the invention relates to the tacky, heat-hardenable adhesive compositions themselves.

10 Claims, No Drawings

SHEET MATERIAL COATED WITH HEAT HARDENABLE TACKY ADHESIVE

This is a continuation-in-part of application Ser. No. 855,361 filed Sept. 4, 1969, now abandoned, which is, in turn, a continuation-in-part of application Ser. No. 785,839 filed Nov. 5, 1968 and now abandoned.

BACKGROUND OF THE INVENTION

This invention relates to sheet material coated with heat-hardenable, tacky adhesive to form adhesive tapes, bonding films and similar products. The tacky adhesive layer provides for temporarily adhering one structure to another at ordinary temperatures and can be subsequently heat-hardened to a strong, permanent bond. Another aspect of the invention relates to the tacky, heat-hardenable adhesive compositions themselves.

Sheet materials of this general type (i.e., those having a tacky, pressure-sensitive, adhesive layer capable of being heat cured to a strong hard permanent bond) are disclosed in my earlier patent, U.S. Pat. No. 3,326,741 issued June 20, 1967. Insofar as is known, that is the only prior art disclosing articles of this type. The present invention is an improvement thereon.

The adhesive layer of the sheet articles of U.S. Pat. No. 3,326,741 is a storable, uniform blend of polymers which are mutually soluble at 300° F. (150° C.) consisting essentially of 1. One part of a substantially entirely curable thermosetting epoxy resin system having an epoxy equivalent of not more than about 1,200 and a softening point of less than 100° C. and
2. From about one-fourth part to about two and one-half parts, of a rubbery butadiene: acrylonitrile copolymer system, said blend being such that when formed into a 3 mil layer it is tacky, flexible and self-sustaining and possesses certain physical qualities measured by test procedures defined in the patent. I.e., it has a. An internal strength value of at least about 5 minutes,
b. An affinity for the surface of a smooth oriented polyester film equal to at least about 1/2 pound per 1/2 inch of width, when measured after storage at 40° F. (5° C.) for six months, and
c. A tensile shear value of at least 1,000 psi (70.3 kilograms per square centimeter) after cure.

The sheet materials of the patent are highly useful for example in the form of adhesive tapes, transfer tapes and fiber reinforced tapes. They hold structures to be united in a fixed position temporarily (due to their tackiness), and can thereafter be heat-hardened to provide strong permanent bonds. The use of complex clamping devices is obviated, and it is possible to bond horizontal or even vertically disposed unsupported structures firmly together with no more than contact-maintaining pressure.

Sheet materials of the types disclosed in U.S. 3,326,741 have a shelf life of about 6 months at 5° C. and are heat-hardenable at temperatures above 175° C. in 15 minutes or more to provide strong, permanent adhesive bonds. Thus, they are eminently suited for many industrial applications.

Despite the utility of the sheet materials of the patent, however, there are numerous applications in which they cannot be used, e.g., where the structures to be bonded cannot withstand the 175° C. hardening temperature, the minimum hardening time of 15 minutes, or both. Examples of such applications are the bonding of plastics which soften at or below 175° C. (e.g., polystyrene, polyethylene, acrylics, etc.) and the bonding of assemblies so large that it is impractical to heat them to the necessary temperature. Additionally, these articles are not able to function in assembly line operations where the adhesive hardening must be performed in a paint baking cycle that normally does not exceed 150° C., or where rapid production rates do not permit adhesive hardening times in excess of 15 minutes.

Although there has been and is a real need for a normally tacky sheet material which is heat-hardenable to provide a strong permanent adhesive bond in less than 15 minutes at temperatures below 175° C. which has at the same time a relatively long shelf life, none has heretofore existed.

DESCRIPTION OF THE INVENTION

The present invention provides sheet material coated with heat-hardenable, tacky adhesive which is subsequently heat-hardenable to a strong permanent bond in 15 minutes or less at 95–125° C. The invention also includes the tacky, heat-hardenable adhesive compositions themselves. The sheet materials and adhesives prepared in accordance with the present invention have a longer shelf life than previously available products (e.g. about 1 year at 5° C.) and have particular utility in bonding plastics such as polystyrene, polyethylene, acrylics, etc. They are also ideally suited for assembly line bonding applications where large assemblies must be heated and cooled in a short period of time, particularly where it is desired to effect the heat-hardening in a paint bake oven.

For example, articles prepared in accordance with this invention are particularly adapted to the bonding of annular reinforcing bands around the flange portion of cathode ray tubes, the band imparting implosion resistance to the tube. The tacky adhesive itself provides reinforcement, holds the band in place during assembly, does not squeeze out of place when the band is tightened, and can be heat-hardened to a strong permanent bond in 15 minutes or less at temperatures of about 95–125° C.

The sheet backings of the invention are provided on at least at one major surface with a tacky, heat-hardenable, substantially solvent-free, cold flow-resistant, coherent layer which essentially comprises a storable uniform blend of polymers which are mutually soluble at 95° C., said blend comprising a physical mixture of 1. 100 parts by weight of a thermosettable resin system containing a component which is a pourable liquid at 95° C. and has the formula

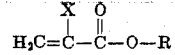

wherein X is H or $CH_3$ and R is an organic radical which contains either an additional acrylic-type (acrylic or methacrylic) unsaturated group or an epoxy group (including components wherein R contains both acrylic-type and epoxy groups and/or more than one of either or more than one of both, as will be seen hereinafter), said resin system being characterized by having a softening point less than 100° C. an epoxy equivalent weight of not more than 1,200 (i.e. no more than 1,200 grams of resin for every 16 grams of oxirane oxygen), and containing from about 1/4 to 6 equivalents of acrylic-type unsaturation per equivalent of epoxy

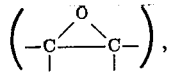

2. from about 25 to 250 parts by weight of an elastomeric (or rubbery) butadiene:acrylonitrile copolymer (which is preferably nonthermoplastic) and
3. an effective amount of a dual curing system for the unsaturated groups and epoxy groups which is substantially inactive at room temperature.

The relative amounts of the constituents employed are such that when the blend is formed (e.g., cast from solvent and dried) to provide a 75 micron (3 mil) film, the film is tacky, flexible and self-sustaining. As measured by test procedures described hereinafter, such film normally has an internal strength value of at least about 5 minutes and is retentive of an affinity for the surface of a smooth oriented polyester film equal to at least about 225 grams per 1.25 centimeters of width (1/2 pound per 1/2 inch of width), when measured after storage at 5° C. for 1 year. The tensile shear value of the cured adhesive layer is similar to that of previously known non-tacky bonding films when cured and at least several times greater than that of previously known normally tacky pressure-sensitive adhesive films (which are not curable). Normally the tensile shear value of the films after cure is at least 1,000 psi (70 kilograms per square centimeter). The temperature at which heat-hardening can take place is lower than that of any normally tacky, heat-hardenable adhesive film previously known, and can be even further reduced (to about 95° C.), with a corresponding increase in time. Likewise, the hardening time can be decreased, with a corresponding increase in temperature.

Preferably the thermosettable resin system, (1) above, either has a viscosity in excess of 100,000 centipoises, or is a solid or semi-solid material. Preferably also all resins and reactive compounds in the thermosettable resin system are mutually soluble and compatible at room temperature; however, it is essential that they be mutually soluble at the temperature of cure to assure intimate reaction of the various ingredients.

The thermosettable resin system can be made up of two or more chemical entities (polymers or compounds) each containing only a single type of reactive group (epoxy or acrylic-type unsaturation) or of one or more entities each containing both types of reactive groups, or of a mixture of both types. Also, the structures of the individual chemical entities therein can be varied considerably (e.g., as to molecular weight, chemical makeup, chain length, number of functional groups, etc.) so long as the system remains within the parameters enumerated above.

In a preferred class, the thermosettable resin system (whether made up of one or more than one chemical entity or species) contains only carbon, hydrogen and oxygen, the oxygen being present in hydroxyl, epoxy, carbonyl, ether and/or ester moities. This class includes the various embodiments shown in the examples set out hereinbelow.

Suitable liquid epoxy-containing materials for use directly in the thermosettable resin system and/or as intermediates in the preparation of chemical entities containing both epoxy groups and acrylic-type unsaturation are di-, tri-, tetra- and polyfunctional with respect to epoxy groups. Preferably, they contain from 2 to 4 epoxy groups per molecule and the most preferred contain 2 epoxy groups. These include the diglycidyl ether of bisphenol A (and it homologs), glycidyl ethers of glycerol, glycidyl ethers of bisphenol F, glycidyl ethers of tetrakis (hydroxyphenyl) ethane and epoxylated novolacs (having 2.5 to 3 or more epoxy groups per molecule). Some exmaples of these are:

A viscous epoxy resin having an epoxy equivalent of approximately 400 grams (per 16 grams of oxirane oxygen) which is obtianed by reacting a mixture of poly(hydroxy phenyl) pentadecanes derived from cashew nut shell liquid with epichlorohydrin. It is available from the Irvington Division of Minnesota Mining and Manufacturing Co., under the trade designation "Cardolite NC514."

A condensation produce of epichlorohydrin and bisphenol-A, having a specific gravity of 1.154, an average molecular weight of approximately 400, and an epoxy equivalent of 870–1,025 grams which is available from Shell Chemical Co., under the trade designation "Epon 1004."

An epichlorohydrin-bisphenol-A-type epoxy resin having a viscosity of 100–160 poises at 25° C. and an epoxy equivalent of 180–195, supplied by Shell Chemical Co. under the trade designation "Epon" 828.

An epichlorohydrin-bisphenol-A-type epoxy resin, slowly pourable at 25° C., having an epoxy equivalent of 230–280, supplied by Shell Chemical Co. under the trade designation "Epon" 834.

Resorcinol digylcidyl ether, having a viscosity of 500 centipoises at 25° C. and an epoxy equivalent of 128, supplied by Koppers Co., Inc. under the trade designation "Kopoxite" 159.

An epichlorohydrin glycerin-type epoxy resin having a viscosity of 0.9–1.5 poises at 25° C. and an epoxy equivalent of 140–160, supplied by Shell Chemical Co. under the trade designation "Epon" 812.

A flame-retardant chlorine-containing epoxy resin having a viscosity of 2,700 cps. at 25° C. and an epoxy equivalent of 230, supplied by Ciba Products Corp. under the trade designation "Araldite" DP-440.

An epichlorohydrin-bisphenol-A-type epoxy resin softening at 40–45° C., having an epoxy equivalent of 280–350, supplied by Shell Chemical Co. under the trade designation "Epon" 836.

The acrylic-type unsaturated groups can be introduced into the thermosettable resin system in products which are reaction products of epoxy resins or compounds containing a plurality of epoxy groups with acrylic acid or methacrylic acid. The same types of intermediates may be prepared by reaction of a suitable diol or polyol (having 3, 4 or more functions) with glycidyl acrylate or methacrylate. Also, acrylyl chloride or methacrylyl chloride can be reacted with a suitable diol or polyol to form suitable intermediates of this type. Other avenues to these intermediates may also be envisioned.

The presently preferred components containing acrylic-type unsaturation are the reaction products of the epoxy-containing materials and acrylic or methacrylic acid. To prepare such components a functional equivalent or excess of the acrylic acid or methacrylic acid is used if it is desired to convert all of the epoxy groups present. An example of this is the reaction product of about 1 mole of the diglycidyl ether of 4,4'-isopropylidenediphenol with about 2 moles of methacrylic acid wherein substantially all of the oxirane groups have reacted to provide an organic compound containing two terminal carbon-carbon double bonds. Numerous other materials containing acrylic-type unsaturation which are suitable for use herein are known or can be prepared, and may be incorporated, in the desired ratio, with any of the epoxy resins disclosed herein.

The acrylic-type unsaturation and epoxy groups can also be present in the same chemical entity. A particularly useful class of compounds of this type are the reaction products of polymers, resins or compounds which are polyfunctional (including difunctional) with respect to epoxy reacted with sufficient acrylic acid or methacrylic acid to esterify part of the epoxy groups, e.g., diglycidyl ether of bisphenol-A reacted with less than the stoichiometric amount of acrylic acid or methacrylic acid resulting in a chemical entity containing both epoxy groups and terminally unsaturated groups. The ratio of the two can be varied to provide compounds or polymers containing any desired ratio of the two types of groups. It is possible in this manner to utilize any of the previously described epoxy-containing materials.

Depending on the specific properties desired, the thermosettable resin system may contain, in addition to the pourable epoxy resin, a solid epoxy resin which is compatible with the nitrile rubber and the thermosettable resin at the temperature of cure. Other constituents, such as inert fillers, may also be present, provided that they do not interfere with the desirable properties of the adhesive (such as tack, shelf life and cured bond strength) to an unacceptable degree.

The dual curing system for the unsaturated groups and the epoxy groups must be such that the constituents are substantially completely inert with respect to one another and with respect to the remainder of the composition at ordinary temperatures, e.g., up to 30° C., but reactive at temperatures of 90° C. or above. Preferred for curing the unsaturated groups are peroxides such as tert-butyl peroctoate, tert-butyl perbenzoate and dicumyl peroxide, usually in an amount of about 1 to 5 percent of the total weight of the blend. The epoxy group curing agent is used preferably in a stoichiometric amount, although it can be increased to about twice the stoichiometric quantity or even more without adverse effect, although greater quantities will decrease the adhesive shelflife. Decreasing the amount of epoxy curing agent below a stoichiometric quantity gradually reduces the strength of the hardened adhesive bond. The presently preferred compound for curing epoxy resin is fumaric acid. The presently preferred combination of hardening agents for the entire system is fumaric acid and tert-butyl peroctoate.

The butadiene:acrylonitrile copolymers used in preparing the compositions of the invention are elastomeric or rubbery in nature and are preferably also non-thermoplastic (i.e., they do not soften progressively with heat or flow with pressure but rather tend to retain their dimensional stability throughout their design range). By the term "elastomeric" when applied to the butadiene: acrylonitrile copolymers is meant the property of a substance of being able to recover substantially from distortion or deformation caused by pressure or stress, and return to its original shape.

The butadiene:acrylonitrile copolymers ordinarily contain from about 18 to 45% by weight of acrylonitrile, the balance being butadiene. Among the commercially available materials which are suitable for use in the present invention are the various copolymers available from the Goodrich Chemical Company under the general trade designation "Hycar." These include "Hycar" 1001×245 (57% butadiene, 43% acrylonitrile), "Hycar" 1001×225 (also 57% butadiene, 43% acrylonitrile), "Hycar" 1002 (67% butadiene, 33% acrylonitrile), "Hycar" 1043 (72% butadiene, 28% acrylonitrile), etc.

The exact amount of butadiene:acrylonitrile copolymer (nitrile rubber) to be blended with the resin system depends in part on the nature of the resin system itself. Thus, for example, where the resin system consists essentially entirely of a liquid epoxy resin, it is necessary to employ a comparatively larger amount of copolymer to provide a polymer blend which when cast in film form is free from excessive cold flow and ooziness. Since one of the major applications for this product is a sheet material which can be wound upon itself in roll form, stored for considerable periods of time prior to use, and subsequently unwound, freedom from excessive cold flow is desirable. Generally speaking, increasing the amount of nitrile rubber employed in the polymer blend increases the toughness and flexibility of the cured bond. On the other hand, increasing the amount of resin system present in the blend increases the cured strength.

At any rate, the amount of nitrile rubber employed is such that when the blend is cast from solvent and dried to provide a 3 mil (75 micron) film, the film is tacky, flexible and self-sustaining. The internal strength is comparable to that of many normally tacky and pressure-sensitive adhesives. It has an initial affinity for metal surfaces which is comparable to or greater than that of most normally tacky and pressure-sensitive adhesives tapes, and it maintains a substantial percentage of this affinity after storage for 1 year at 5° C. When subjected to a cure of 15 minutes at 95° C. the tensile shear value of the cured layer is similar to that of existing non-tacky bonding films and at least several times as great as that of any normally tacky pressure-sensitive adhesive film previously known. The temperature at which curing takes place can be reduced, with a corresponding increase in time, to obtain comparable tensile shear values. Likewise, the curing temperature can be increased, with a corresponding decrease in time. As a practical matter, the adhesive should not be exposed to temperatures appreciably in excess of 500° F. (260° C.).

It has been found that certain tests are extremely useful in determining whether the characteristics of the blend referred to in the preceding paragraphs render it satisfactory for its intended uses. Three of these tests are described in succeeding paragraphs.

The internal strength of the uncured adhesive blend may be measured by coating from solution sufficient adhesive to deposit a dry 75 micron (3-mil.) layer on paper, polyester film, or any other suitable flexible backing material. Two 1.25 cm. (½ inch) wide strips of the coated backing are placed in face-to-face relationship so that they overlap each other by 1.25 cm. (½ inch), resulting in a mutual adhesive contact area of 1.25 cm. × 1.25 cm. (½ inch by ½ inch). The two strips are pressed by rolling with a weighted roll in a standard manner, and are then tensioned by the application of a force of 1,000 gms. applied between the free ends of the two strips. The time for the face-to-face bond to fail (by sliding apart) is a measure of the internal strength of the adhesive. It has been generally found that the time required for failure of suitable polymer blends is at least 5 minutes, and preferably in excess of 40 minutes; in many cases the time before failure occurs is several hours.

A quantitative measurement of the tackiness of the polymer blend may be made by the stripback adhesion test. In this test a strip of 1.25 cm. (½ inch) wide sheet material, preferably 25 micron (1-mil.) polyester film, is provided with a 75 micron (3-mil.) coating of polymer blend, and placed adhesive face down on a strip of smooth oriented polyester film (e.g., biaxially oriented polyethylene terephthalate), which is turn is firmly adhered to a smooth horizontally disposed steel plate. The strip is pressed into adhesive contact with the polyester film by passing a hard rubber roller weighing 2.1 k.g. (4.5 lbs.) once over the strip at a rate of 3.75 cm./sec. The far end of the strip is attached to a suitable scale and the steel plate moved away from the scale at the rate of 3.75 cm./sec. The portion of the tape removed comes back adjacent but not quite touching the portion still adherently attached. The scale reading in kilograms or pounds is a measure of the adhesion to the polyester film. Even after storage for one year at 5° C., adhesive blends which are employed in the practice of this invention display an affinity for the polyester film equal to at least about 225 gms. per 1.25 cm. (½ lb. per ½ inch) of width, and preferably at least about 450 gms. per 1.25 cm. (1 lb. per ½ inch) of width, at room temperature. It has been found that the affinity for a smooth clean metal plate is several times higher than the affinity for polyester film.

The degree of bond strength obtained following hardening of the adhesive layer may be measured by the tensile shear test. In this test two 18 cm. × 10 cm. × 0.16 cm. (7-inch × 4-inch × 0.064-inch) aluminum panels are assembled with a 1.25 cm. (½ inch) overlap along their 18 cm. (7-inch) edges, a tacky 75 micron film of polymer blend being placed between the faying surfaces. The assembled panels are bonded in a heated press at a pressure of 3.5 kgs./cm.² (60 psi) and a temperature of 120° C., for a period of 5 minutes. The bonded assembly is then cooled and sawed, at right angles to the joint, into 2.5 cm. (1 inch) wide test strips, the ends of which are clamped in the jaws of a tensile tester and pulled apart at a rate of 0.125 cm. (0.05 inch) per minute. Failure occurs in the bonding layer, the force required, expressed in kgs./cm.² (or pounds per square inch) of overlap, being a measure of the bonding ability of the cured adhesive. Satisfactory products display tensile shear value of at least 70 kgs./cm.² (1,000 psi), and preferably at least 100 kgs./cm.² (1,500 psi), after cure.

Although the invention embraces the use of a tacky and curable layer in combination with a wide variety of sheet backings, several specific products are contemplated. One such product, which may be designated as a thermosetting adhesive transfer tape, comprises a temporary laminate backing and a tacky curable film of the type previously described. Products of this type may be wound in roll form, unwound like conventional pressure-sensitive adhesive tape, and applied to one surface of a structure which is to be bonded. The temporary backing may then be removed, exposing a second tacky surface of the adhesive layer, to which a second structure may be adhered. The two structures are thus firmly adhered to each other, and, upon the application of heat for a suitable period of time are permanently bonded by the hardening of the adhesive film.

Another embodiment specifically contemplated is a tape product in which the tacky polymer blend layer is permanently adhered to a reinforcing backing, such as woven glass cloth. The finished product is suitable for wrapping electrical components, the tacky nature of the polymer blend serving to hold the tape in position during application and prior to final hardening of the blend. In still another type of product, a non-woven fibrous web is included internally of the polymer blend layer, considerably enhancing its otherwise low film strength prior to cure. The adhesive itself is also contemplated as a product.

The invention is further illustrated by reference to the following non-limiting examples in which all parts are by weight unless otherwise noted.

Examples 1-8 relate to systems of the invention in which the epoxy groups and the terminal unsaturation are present in separate constituents.

The epoxy groups in these examples are provided by an epoxy resin of the formula

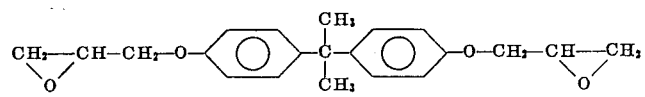

having an average epoxy equivalent weight (molecular weight/number of epoxy groups) of about 185-192, which is available under the trade designation "Epon" 828 from the Shell Chemical Company. This resin is sometimes referred to herein as Epoxy I.

The terminal unsaturation in these examples is provided by a resin of the formula

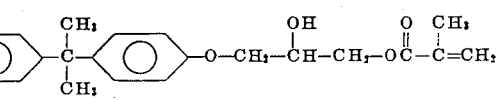

having an average unsaturated equivalent weight (molecular weight/number of unsaturated groups) of about 256, obtained from the Shell Chemical Company under the trade designation "Epocryl" E 11. This resin is sometimes referred to herein as Unsatd I.

The elastomeric (rubbery) butadiene: acrylonitrile copolymer utilized in these examples contains approximately 57 percent butadiene and 43 percent acrylonitrile, has a Mooney viscosity range of 85-115 and is available from the Goodrich Chemical Company under the trade designation "Hycar" 1001×245. This copolymer is sometimes referred to as Bd:An I.

The adhesive formulations of Examples 1-5 were prepared as follows: The butadiene:acrylonitrile copolymer was milled on a tight, cold, twin-roll rubber mill for 15 minutes and dissolved at 20% solids in methyl ethyl ketone. This solution, the thermosettable resin system (containing the epoxy and unsaturated groups) and the curing agents (fumaric acid, available from the FMC Corporation under the trade designation FMC curing agent 325, and tert-butyl peroctoate) were stirred together in the amounts shown in Table I until uniform blends were obtained. The amounts specified in Table I are in parts by weight on a 100% solids basis.

TABLE I

| Example No. | Th.sett. resin system | | | Bd:An I | Curing agents | |
|---|---|---|---|---|---|---|
| | Epoxy I | Unsat'd I | Ratio unsat'd: epoxy grps. | | Fumaric acid | Tert-butyl peroctoate |
| 1 | 60 | 40 | 0.49/1 | 50 | 18 | 3.3 |
| 2 | 50 | 50 | 0.73/1 | 50 | 15 | 3.3 |
| 3 | 40 | 60 | 1.1/1 | 50 | 12 | 3.3 |
| 4 | 30.4 | 69.6 | 1.68/1 | 50 | 9 | 3.2 |
| 5 | 10.1 | 80.9 | 6.5/1 | 50 | 3 | 3.4 |

These formulations remained as essentially unreacted mixtures of the constituents at room temperature. Each was next coated on a silicone-treated liner and dried at 60° C., for 15 minutes to leave 63 gms./m² of adhesive (15 grains per 24 square inches). Adhesive tapes were prepared by laminating a film of each adhesive to both sides of a non-woven web formed from 1.5 denier polyester with a polyamide binder.

Each tape was tested by washing 18 cm. × 10 cm. × 0.16 cm. (7 × 4 × 0.064 inch) aluminum panels with heptane and then with methyl ethyl ketone. Sets of test specimens were assembled with a 1.25 cm. (1/2 inch) overlap along their 18 cm. (7 inch) edges, by placing the tacky tape between the faying surfaces, and curing the assembly at a pressure of 3.5 kgs/cm.² (50 psi), for 15 minutes at 120° C. Each bonded panel was sawed into 2.5 cm. (1 inch) wide test specimens having a bonded area of 1.25 × 2.5 cm. (1/2 × 1 inch) and the adhesive shear strength was determined on a tensile tester at a jaw separation rate of 0.125 cm. (0.05 inch) per minute. Each adhesive had excellent shear strength, the test results being shown in Table II.

TABLE II

| Example No. | Bond Strength (kgs./cm.²) | Type of Failure |
|---|---|---|
| 1 | 68 | cohesive |
| 2 | 87 | cohesive |
| 3 | 96 | cohesive |
| 4 | 127 | primarily cohesive |
| 5 | 62 | adhesive |

Examples 6-8

Additional test specimens were prepared utilizing the adhesive tape of Example 4, the specimens were cured and the bond strengths were determined. The procedures set out above were used except that the cure temperature and time were varied. The results are given in Table III.

TABLE III

| Example | Cure Temperature | Cure Time | Bond Strength (kgs./cm.²) |
|---|---|---|---|
| 6 | 95° C. | 15 min. | 108 |
| 7 | 110° C. | 10 min. | 121 |
| 8 | 120° C. | 5 min. | 115 |

Examples 9-14

Examples 9-14 relate to systems of the invention in which the epoxy groups and the unsaturation are present in the same constitutent. In these examples methacrylic acid was first reacted with an epoxy resin, reaction taking place between the carboxyl and epoxy groups. The relative amounts of the acid and epoxy resin were such that some of the epoxy groups remained after all of the carboxyl groups had reacted, e.g.

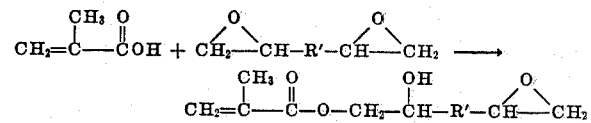

wherein R' denotes additional structure between the functional groups of the epoxy resin.

The procedure used in reacting the acid and the resin in these examples was as follows: A 1 liter, three-neck flask fitted with stirrer, thermometer, and dropping funnel was used. One mole of methacrylic acid (86.1 grams), 371.6 gms. of Epoxy I ("Epon" 828, see above) 1.96 gms. of triphenyl stibine, and 0.66 gm. of triphenyl phosphine were added to the flask (the triphenylstibine and triphenylphosphine being catalysts for the reaction of the epoxy groups with the carboxy groups), and the reaction was run at 118° – 134° C. for 2 hours and 8 minutes with constant stirring. Titrimetric analysis for acid indicated that essentially all methacrylic acid was reacted. Analysis for epoxy content showed the product to have an epoxy content of one equivalent per 518.8 gms. (theoretical 457.5). The product was a gummy solid which flowed slowly at room temperature.

The adhesive formulation of Examples 9-14 was prepared as follows: Bd:An I (see above) and fumaric acid were milled together on a tight, cold, twin-roll rubber mill for 30 minutes with cutting and blending and the milled blend was dissolved in methylene chloride to provide a 15.15 percent solids solution. This solution, the thermosettable resin system (containing the epoxy and unsaturated groups), tert-butyl-peroctoate and N,N-dimethyl-p-toluidine were stirred together in the amounts shown in Table IV.

TABLE IV

| | |
|---|---|
| The thermosettable resin system (reaction product of methacrylic acid and Epoxy I in which the ratio of unsaturated to epoxy groups is approximately 1:1) | 100 |
| Bd:An I | 50.0 |
| Fumaric acid | 11.3 |
| Tert-butylperoctoate | 1.5 |
| N,N-dimethyl-p-toluidene | 0.3 |

The constituents in Table IV are expressed on a 100 percent solids basis except for the N,N-dimethyl-p-toluidine (in which the amount added is given). This material, the N,N-dimethyl-p-toluidine boils at 211° C./760mmHg and is somewhat volatile. Thus, some, but not all, of it is lost during drying.

This mixture was coated on silicone release liner and dried at 40° C. for 45 minutes to leave a film weighing .63 gms/m² (15 grains per 24 square inches). A film of this adhesive was laminated to each side of a non-woven mat formed from 1.5 denier polyester with polyamide binder by means of squeeze rolls to form a tacky adhesive film.

This adhesive film was used to bond aluminum panels, previously washed with methyl ethyl ketone, in the manner of the preceding Examples. Table V illustrates the various bonding times and temperatures used and test results obtained. Examples 9–14 all displayed 100 percent cohesive failure when the bonds broke, indicating excellent adhesion to the aluminum surface.

TABLE V

| Example | Bonding Temp. | Cure Time | Bond Strength (kgs./cm.²) |
|---|---|---|---|
| 9 | 95° C. | 15 min. | 91 |
| 10 | 120° C. | 5 min. | 115 |
| 11 | 110° C. | 15 min. | 104 |
| 12 | 120° C. | 5 min. | 99 |
| 13 | 90° C. | 15 min. | 92 |
| 14 | 120° C. | 5 min. | 105 |

The remaining examples, Example 15–18, also relate to systems in which the epoxy groups and the terminal unsaturation are present in the same constituent (as did Examples 9–14).

Examples 15–17

Three different epoxy resins were reacted with methacrylic acid to form the thermosettable resin systems of these examples. These were as follows:

A polymer of the general formula

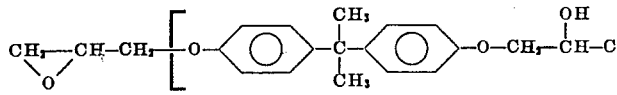

having an average epoxy equivalent weight of about 326 which is available under the trade designation "Epon" 836 from the Shell Chemical Company. This resin is sometimes referred to herein as Epoxy II.

A compound of the general formula

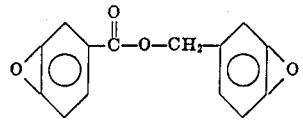

having an average epoxy equivalent weight of about 136 which is available under the trade designation "Araldite" CY-179 from the Ciba Corporation. This resin is sometimes referred to herein as Epoxy III.

A polymer of the general formula

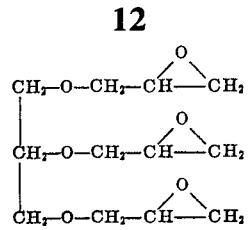

having an average epoxy equivalent weight of about 160 which is available under the trade designation "Epon" 812 from the Shell Chemical Company. This resin is sometimes referred to herein as Epoxy IV.

Each was reacted with methacrylic acid using the reaction equipment of Examples 9–14. The constituents and the relative amounts thereof used in preparing the thermosettable resins of these examples are given in Table VI.

TABLE VI

| Example No. | The epoxy resin | Parts of epoxy resin | Parts of methacrylic acid | Methacrylic acid addition time | Reaction time at 94–97° C. |
|---|---|---|---|---|---|
| 15 | Epoxy II | 88.35 | 11.65 | 3 hours | 20 hours. |
| 16 | Epoxy III | 76.10 | 23.9 | 2½ hrs. | 1 hour. |
| 17 | Epoxy IV | 78.85 | 21.15 | 37 min. | 16 hours. |

The procedure used in each case was as follows: For each part of methacrylic acid there was also added: 0.0228 part of triphenyl stibine and 0.00778 part of triphenyl phosphine. For each part of epoxy resin there was added 0.0001 part of the monomethyl ether of hydroquinone. The flask and its contents were heated to 94–97° C. The methacrylic acid was then added to the flask over the period indicated, the temperature being maintained at 94–97° C. The reaction mixture was maintained at the same temperature after all of the methacrylic acid had been added for the period of time indicated in Table VI. Titrimetric analysis for acid indicated that essentially all of the methacrylic acid had reacted in each case.

The adhesive formulations of Examples 15–17 were prepared as in Examples 9–14 using the respective thermosettable resins and the same solution of Bd:An I and fumaric acid in methylene chloride. Tert-butyl peroctoate and N,N-dimethyl-p-toluidine were also added as in Examples 9–14. The relative amounts were as follows:

TABLE VII

| Example No. | The thermosettable resin system | Bd:An I | Fumaric acid | Tert-butyl peroctoate | N,N-dimethyl-p-toluidine |
|---|---|---|---|---|---|
| 15 | 100 | 50 | 11.7 | 1.5 | 0.3 |
| 16 | 100 | 50 | 11.7 | 1.5 | 0.3 |
| 17 | 100 | 50 | 11.7 | 1.5 | 0.3 |

The mixtures were each coated on silicone release liners and dried at 40° C. for 45 minutes to leave an adhesive film weighing 65 gms./m² (15 grains per 24 square inches). A sample of each adhesive film was laminated to both sides of a non-woven mat formed from 1.5 denier polyester with polyamide binder by means of squeeze rolls to form a tacky adhesive film.

Each adhesive film was used to bond aluminum panels and the bond strength was determined, in the manner of the preceding examples. The curing cycle used in each was 15 minutes at 110° C. The test results obtained are set out in Table VIII.

TABLE VIII

| Example No. | Bond Strength (kgs./cm²) |
| --- | --- |
| 15 | 100 |
| 16 | 110 |
| 17 | 71 |

Example 18

A 1-liter, 3-neck flask fitted with stirrer, thermometer, and dropping funnel was used to prepare resin as follows: Acrylic acid (16.3 parts), Epoxy I (83.7 parts), triphenyl stibine (0.42 part), monomethyl ether at hydroquinone (0.0086 part) and triphenyl phosphine (0.15 part) were added to the flask and reacted at 94–97° C. for 29 hours with constant stirring. Titrimetric analysis for acid indicated that essentially all acrylic acid was reacted and analysis for epoxy content showed the product to have an epoxy equivalent weight of 462. (theoretical 443.6).

An adhesive solution was prepared as in Examples 15–17, the amounts of the various constituents being shown in Table IX (in parts by weight on a 100 percent solids basis except for the N,N-dimethyl-p-toluidine):

TABLE IX

| | |
| --- | --- |
| The thermosettable resin (reaction product of acrylic acid and Epoxy I) | 100 |
| Bd:An I | 50 |
| Fumaric Acid | 11.3 |
| Tert-butyl peroctoate | 1.5 |
| N,N-dimethyl-p-toluidine | 0.3 |

The mixture was coated on silicone release liner and dried at 40° C. for 45 minutes to leave a film weighing about 63 gms./m² (15 graims per 24 square inches). A film of the adhesive was laminated to each side of a non-woven mat, formed from 1.5 denier polyester fiber which had been unified with polamide binder, by means of squeeze rolls to form a tacky adhesive film.

This adhesive film was used to bond aluminum panels at 110° C. for 15 minutes and the bond strength determined, all in the manner of the preceding examples. The bond strength was 112 kgs./cm².

What is claimed is:

1. A sheet backing provided on at least at one major surface with a tacky, heat-hardenable, substantially solvent-free, cold flow-resistant, coherent layer which essentially comprises a storable uniform blend of polymers which are mutually soluble at 95° C., said blend comprising a physical mixture of
    1. 100 parts by weight of a thermosettable resin system containing both acrylic-type unsaturation and epoxy groups, one component of which is a pourable liquid at 95° C. having the formula

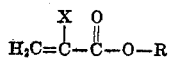

wherein X is H or CH$_3$ and R is an organic radical containing either an additional acrylic-type unsaturated group or an epoxy group, said resin system being characterized by having a softening point less than 100° C. an epoxy equivalent weight of not more than 1,200, and containing from about 1/4 to 6 equivalents of acrylic-type unsaturation per equivalent of epoxy, 2. from about 25 to 250 parts by weight of an elastomeric butadiene:acrylonitrile copolymer containing 18–45 percent acrylonitrile, the balance being butadiene and
    3. an effective amount of a dual curing system which is substantially inactive at room temperature and which contains about 1–5 percent, based on the total weight of the blend, of a peroxide curing agent for the unsaturated groups and at least a stoichiometric amount of an epoxy group curing agent, said constituents being present in amounts such as to render said blend when formed per se in a 75 micron layer, tacky, flexible and self-sustaining, possessed of an internal strength value of at least about 5 minutes, retentive of an affinity for the surface of a smooth oriented polyester film equal to at least about 225 grams per 1.25 centimeters of width, when measured after storage at 5° C. for one year, and capable of displaying a tensile shear value of at least 70 kilograms per square centimeter after cure.

2. An article according to claim 1 wherein the component containing the acrylic-type unsaturation is a reaction product of an epoxy resin of 4,4'-isopropylidenediphenol with methacrylic acid.

3. An article according to claim 2 wherein the component containing the acrylic-type unsaturation is the reaction product of about 1 mole of the diglycidyl ether of 4,4'-isopropylidenediphenol with about 2 moles of methacrylic acid wherein substantially all of the oxirane groups have reacted.

4. An article according to claim 2 wherein the component containing the acrylic-type unsaturation is the reaction product of about 1 mole of the diglycidyl ether of 4,4'-isopropylidenediphenol with about 1 mole of methacrylic acid wherein substantially one-half of the oxirane groups have reacted.

5. An article according to claim 1 wherein the dual curing system is a combination of a peroxide and fumaric acid.

6. An article according to claim 5 wherein the peroxide is tert-butyl peroctoate.

7. An article according to claim 1 wherein the component containing the acrylic-type unsaturation is a reaction product of an epoxy resin of 4,4'-isopropylidenediphenol with acrylic acid.

8. A composite tape-like product capable of being wound upon itself in roll form and subsequently unwound without delamination or transfer comprising a flexible sheet backing having adhered thereto over one major surface a tacky, heat-hardenable, substantially solvent-free, cold flow-resistant, coherent layer which essentially comprises a storable uniform blend of polymers which are mutually soluble at 95° C., said blend comprising a physical mixture of
    1. 100 parts by weight of a thermosettable resin system containing both acrylic-type unsaturation and epoxy groups, one component of which is a pourable liquid at 95° C. having the formula

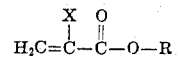

wherein X is H or CH$_3$ and R is an organic radical containing either an additional acrylic-type unsaturated group or an epoxy group, said resin system being characterized by having a softening point less than 100° C. an epoxy equivalent weight of not more than 1200, and containing from about 1/4 to 6 equivalents of acrylic-type unsaturation per equivalent of epoxy, 2. from about 25 to 250 parts by weight of an elastomeric butadiene:acrylonitrile copolymer containing 18–45 percent acrylonitrile, the balance being butadiene and 3. an effective amount of a dual curing system which is substantially inactive at room temperature and which contains about 1–5 percent, based on the total weight of the blend, of a peroxide curing agent for the unsaturated groups and at least a stoichiometric amount of an epoxy group curing agent, said constituents being present in amounts such as to render said blend when formed per se in a 75 micron layer, tacky, flexible and self-sustaining, possessed of an internal strength value of at least about 5 minutes, retentive of an affinity for the surface of a smooth oriented polyester film equal to at least about 225 grams per 1.25 centimeters of width, when measured after storage at 5° C. for one year, and capable of displaying a tensile shear value of at least 70 kilograms per square centimeter after cure.

9. A composite thermosetting adhesive transfer tape comprising in combination a self-supporting smooth web and, releasably adhered to one face of said web, a tacky, heat-hardenable substantially solvent-free adhesive film, whereby the exposed surface of said adhesive may be adhered to a structure to be bonded, the web removed without disrupting the adhesive film, a second structure applied to the newly exposed adhesive surface and temporarily adhered thereby to the first structure, and the adhesive film thereafter heat-cured to permanently bond said structures together, said adhesive film consisting essentially of a storable uniform blend of polymers which are mutually soluble at 95° C., said blend comprising a physical mixture of 1. 100 parts by weight of a thermosettable resin system containing both acrylic-type unsaturation and epoxy groups, one component of which is a pourable liquid at 95° C. having the formula

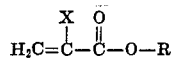

wherein X is H or $CH_3$ and R is an organic radical containing either an additional acrylic-type unsaturated group or an epoxy group, said resin system being characterized by having a softening point less than 100° C. an epoxy equivalent weight of not more than 1,200, and containing from about 1/4 to 6 equivalents of acrylic-type unsaturation per equivalent of epoxy, 2. from about 25 to 250 parts by weight of an elastomeric butadiene:acrylonitrile copolymer containing 18–45 percent acrylonitrile, the balance being butadiene and 3. an effective amount of a dual curing system which is substantially inactive at room temperature and which contains about 1–5 percent, based on the total weight of the blend, of a peroxide curing agent for the unsaturated groups and at least a stoichiometric amount of an epoxy group curing agent, said constituents being present in amounts such as to render said blend when formed per se in a 75 micron layer, tacky, flexible and self-sustaining, possessed of an internal strength value of at least about 5 minutes, retentive of an affinity for the surface of a smooth oriented polyester film equal to at least about 225 grams per 1.25 centimeters of width, when measured after storage at 5° C. for one year, and capable of displaying a tensile shear value of at least 70 kilograms per square centimeter after cure.

10. A fiber-reinforced tacky heat-advancing adhesive film comprising in combination a fibrous web provided, at least at one major surface, with a tacky, heat-hardenable, substantially solvent-free storable uniform blend of polymers which are mutually soluble at 95° C., said blend comprising a physical mixture of (1) 100 parts by weight of a thermosettable resin system containing both acrylic-type unsaturation and epoxy groups, one component of which is a pourable liquid at 95° C. having the formula

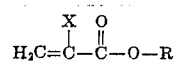

wherein X is H or $CH_3$ and R is an organic radical containing either an additional acrylic-type unsaturated group or an epoxy group, said resin system being characterized by having a softening point less than 100° C. an epoxy equivalent weight of not more than 1,200, and containing from about 1/4 to 6 equivalents of acrylic-type unsaturation per equivalent of epoxy, 2. from about 25 to 250 parts by weight of an elastomeric butadiene:acrylonitrile copolymer containing 18–45 percent acrylonitrile, the balance being butadiene and 3. an effective amount of a dual curing system which is substantially inactive at room temperature and which contains about 1–5 percent, based on the total weight of the blend, of a peroxide curing agent for the unsaturated groups and at least a stoichiometric amount of an epoxy group curing agent, said constitutents being present in amounts such as to render said blend when formed per se in a 75 micron layer, tacky, flexible and self-sustaining, possessed of an internal strength value of at least about 5 minutes, retentive of an affinity for the surface of a smooth oriented polyester film equal to at least about 225 grams per 1.25 centimeters of width, when measured after storage at 5° C. for one year, and capable of displaying a tensile shear value of at least 70 kilograms per square centimeter after cure.

* * * * *